July 5, 1949.   D. D. DE NISE   2,475,484
METHOD AND MEANS FOR IMPARTING FEEL-BACK
TO A MANUALLY-MOVABLE CONTROL ELEMENT
Filed May 14, 1946   4 Sheets-Sheet 4
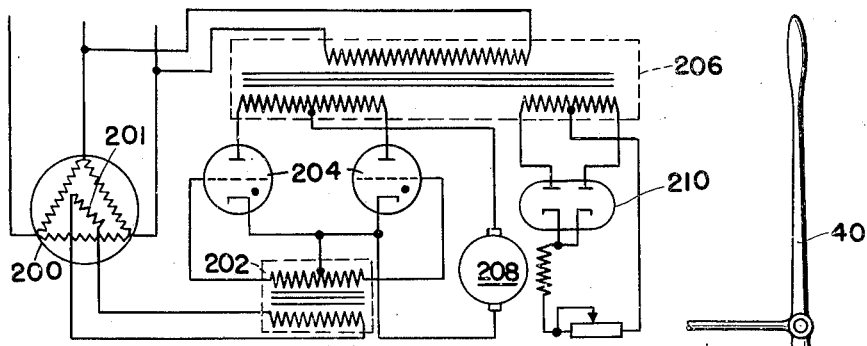
FIG_12
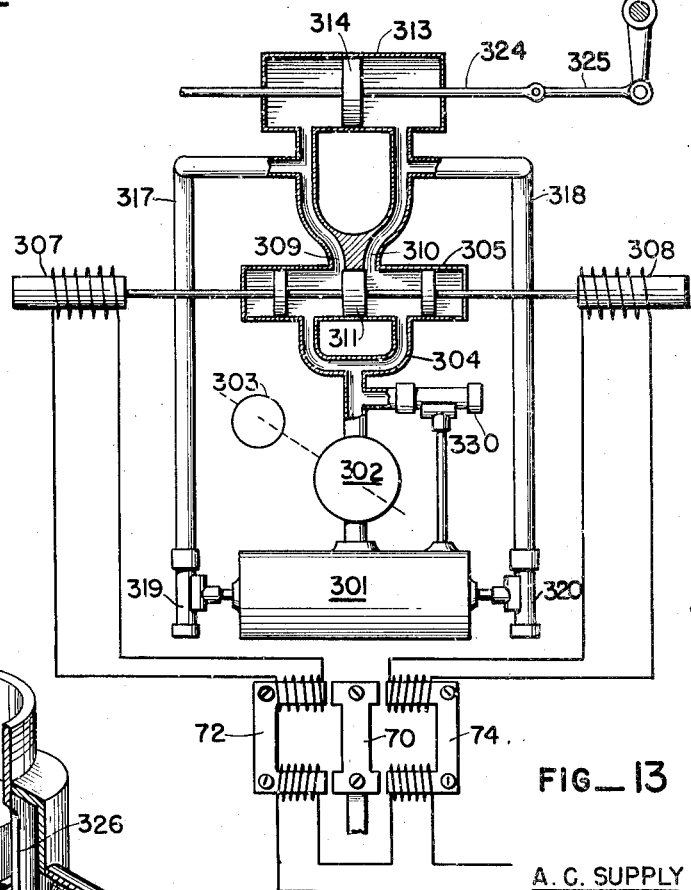
FIG_13
A.C. SUPPLY
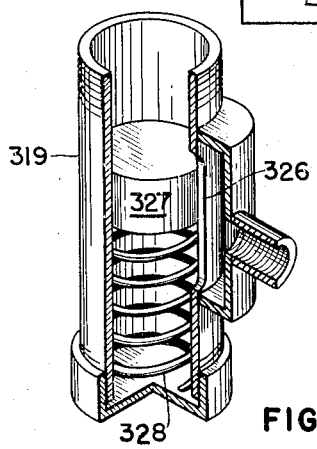
FIG_14
DWIGHT DEE DE NISE
INVENTOR
BY Smith + Tuck
ATTORNEYS Patented July 5, 1949

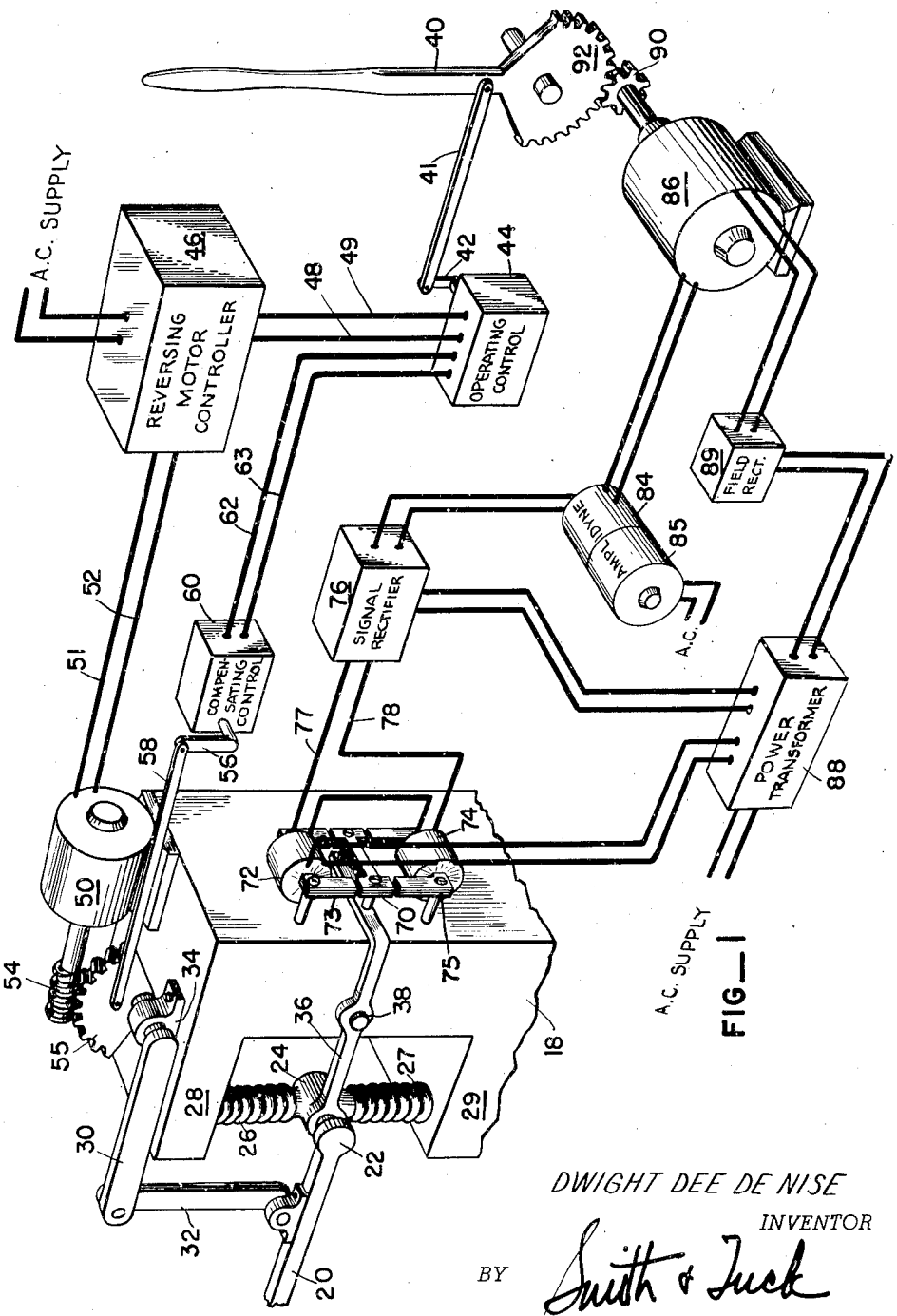

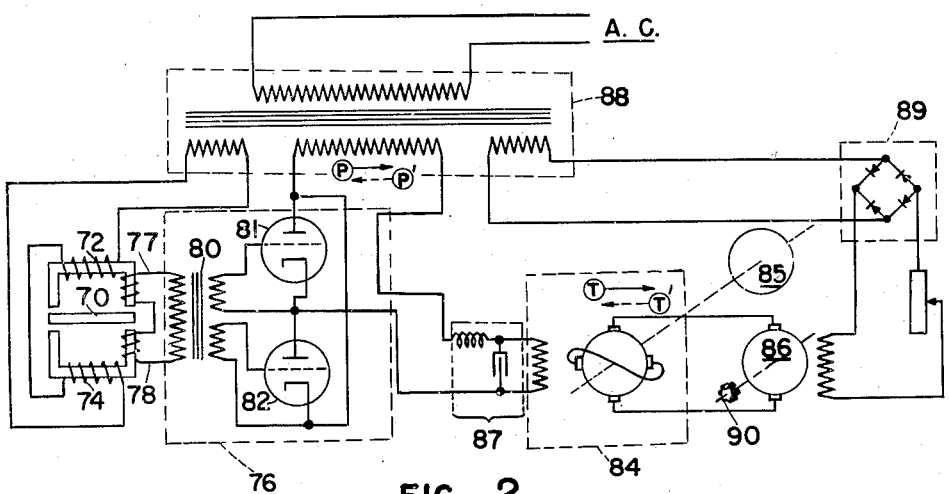
FIG_2
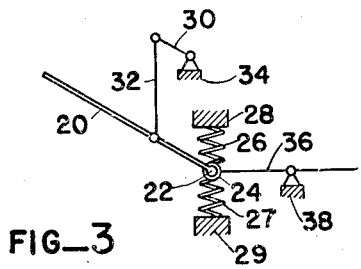
FIG_3
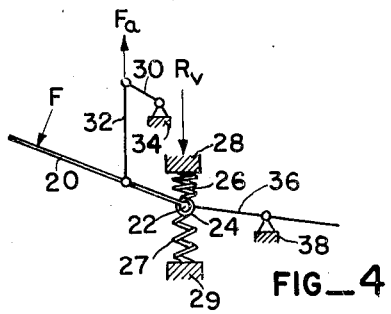
FIG_4
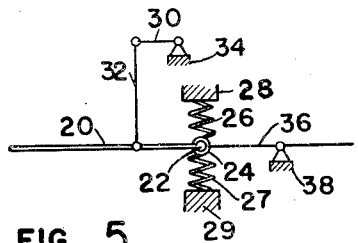
FIG_5
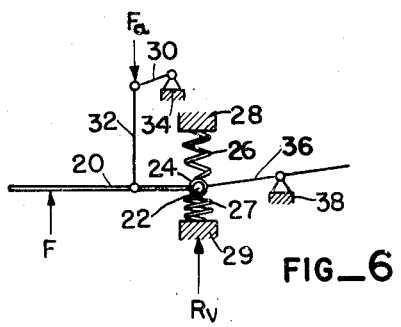
FIG_6
DWIGHT DEE DE NISE
INVENTOR
BY *Smith & Tuck*
ATTORNEYS

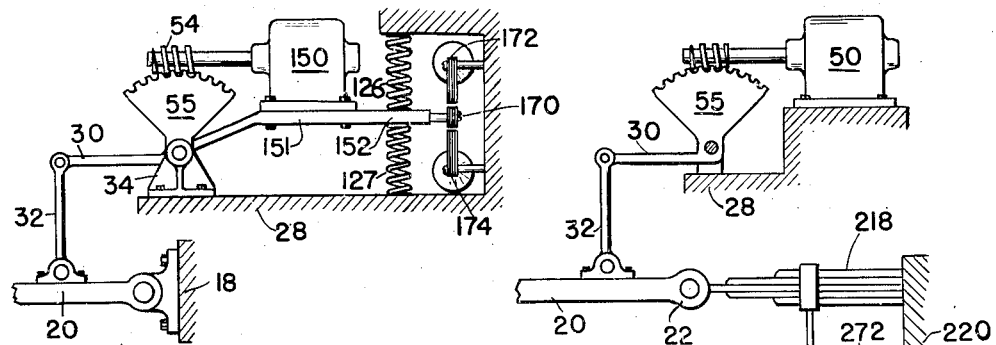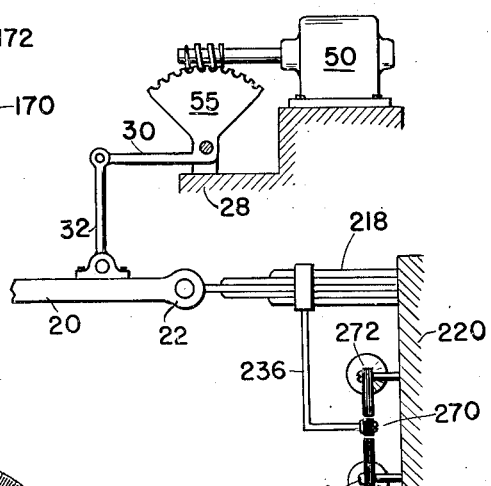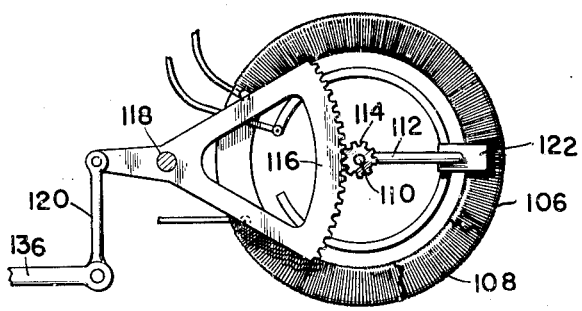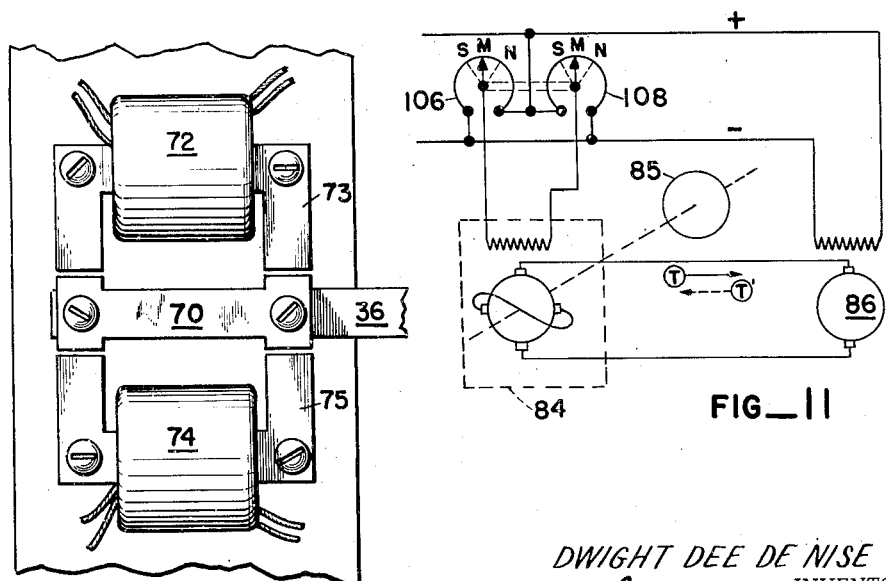

2,475,484

UNITED STATES PATENT OFFICE 2,475,484

METHOD AND MEANS FOR IMPARTING FEEL BACK TO A MANUALLY-MOVABLE CONTROL ELEMENT

Dwight Dee De Nise, Seattle, Wash.

Application May 14, 1946, Serial No. 669,490

10 Claims. (Cl. 318—30)

This invention relates to a method and means for imparting "feel-back" to a manually-movable control element and, more particularly, to a method and mechanism for applying reaction-reflective force to a manually-movable control element in proportion to external forces applied to a remote element that responds to the movement of the manually movable-control element.

This invention has many applications as will become more apparent upon a reading of the specification and its description, in which the invention is associated with aircraft operation as an excellent example. Merely because I choose thus to speak of its application and use to flight machines, I do not intend thereby to limit my invention solely to aircraft. Many installations will readily come to the mind of engineers and mechanics skilled in the field and such applications are intended to be within the scope of this invention.

In aircraft, electric power is an indispensable factor for many purposes which have been highly explored and in which cases it is employed as a prime source of power. For example, electric power is widely used for heating, illumination, air-conditioning, and the operation of pumps, flaps, and the like, throughout airplanes. It finds a natural use in the field of communication, both within and without the craft. For operation purposes in connection with the engines, variable-pitch propellers, and the like, electricity is also a practical power source. For these reasons, powerful electric generators are among the commonplace equipment of most aircraft and, particularly, of the larger transport and bomber types. Yet, when it comes to consideration of the use of this fine source of power for control of the craft, it is seldom if ever used, and this field has been restricted largely to mechanical and hydraulic systems. It is a challenge to the electrical engineer to see the potentialities of electricity in the field of operation of the flight controls, such as the rudder, elevators, and ailerons, both because of the ready availability of electricity and its great utility and convenience of handling. However, the problems confronting the engineer have been quite insurmountable up to this time, for the reason stated by Mabel Macferran Rockwell, a research engineer of Lockheed Aircraft Corporation, who says, in "Electrical Engineering" for November, 1944 (pp. 400–402): "The main flight controls in large airplanes involve two important requirements—there must be multiplication of the pilot's power and range of motion, and there must be 'feel-back'—that is, the pilot insists on feeling the reaction of the surfaces to the force he exerts on the control stick and rudder pedals . . . The power multiplication is easy for electricity of achieve; but the 'feel-back' is not." Thus it can be seen that industry and, particularly, the aircraft engineer, understands and regrets what have appeared to be limitations of electricity that could not be overcome. It is therefore a prime object of the invention to provide, for operators of remote-controlled elements, a "feel-back" or reflection (derived electrically) of the forces acting on those remote-controlled elements.

Another object of the invention resides in the provision of a "feel-back" method, capable of being practiced electro-mechanically or electro-hydraulically, in connection with remotely operated controlled elements.

A further object of the invention is the provision of "feel-back" by a method that includes permitting a deflection to occur in the structure of a controlled mechanism in response to external force, and then detecting, measuring, and converting such deflection into an electrical signal that is employable to create a "reflected" force applicable to a manually operable element in the sphere of the operator.

Still another object of the invention is the application to a controlled element for land, air, and water vehicles, or for industrial mechanisms, of electro-mechanical remotely-operable means that accurately provides the operator with "feel-back."

A still further object of the invention is to provide an electro-mechanical control operating system, for vehicles, that has "feel-back" and that is easy to create, install, maintain and operate and is not easily disrupted or unbalanced even under extreme conditions of use.

One more object of the invention is the provision of an electrically-operable element that accurately and rapidly detects deflections occurring in a controlled element for the purpose of creating force operable to feed to a remote operator a sense of the reaction forces.

The foregoing objects and others ancillary thereto, I prefer to accomplish as follows:

According to the preferred embodiment of my invention, I provide a deflective mount that supports an element on which external forces may react, and from which signals are to be obtained. Such element may be operated by any mechanism, but is preferably operated by remote control obtained through electro-mechanical means. When deflection occurs it is detected by a mechanism which also measures it and transforms the deflection into a signal that is later employed. A most preferred form of detecting means is a differential transformer in which there is a movable bridge member between opposed fields, said bridge being coupled so as to move when deflection occurs. From this transformer no current flows during normal or normally adjusted conditions, but upon the occurrence of a deflection the unbalance results in the creation of a voltage or a current that may be employed in any of the several electrical elements to translate the same into a force reflective of the deflection being accommodated. Such force is then applied to the operative element, usually an operating lever, where it may be sensed by an operator as a "feel-back" from his remotely operated controlled element, much the same as though he were actually moving that element through direct mechanical means. There are many alternatives that may be used in such a system. For example, on one hand, an amplidyne and torque motor may be the element that responds to a signal received from the variable transformer, while others may prefer to employ a solenoid-operated control valve in an hydraulic circuit, with which to create the reaction reflective force applicable to the operating lever. On the other hand, for the transformer mentioned, deflection detectors of the Selsyn type or the variable resistor type may find useful application in certain cases. Various types of deflective mounts may also be employed. Alternative means may be used to detect and measure the tendency of a mount to deflect. In the application of a reflective force to the manually operable lever or other element, I have shown the use of a pinion and segment between the lever and a motor, preferably a torque motor, as being a simple and practical means. Naturally, others, the mechanical equivalents, may be substituted without departing from the invention.

The novel features that I consider characteristic of my invention, are set forth with particularity in the appended claims. The invention itself, however, both as to its organization and its method of operation, together with additional objects and advantages thereof, will best be understood from the following description of a specific embodiment when read in connection with the accompanying drawings, in which:

Fig. 1 is a schematic perspective view detailing the general elements of my reaction reflective mechanism;

Fig. 2 is a wiring diagram illustrating the "feel-back" portion of the electrical circuit of the assembly of Fig. 1;

Figures 3, 4, 5, and 6 are force diagrams illustrating certain normal and force-reacting conditions to be accommodated by my mechanism;

Figure 7 is a face view of a differential transformer;

Figures 8 and 9 are schematic views of alternate deflection mechanisms;

Fig. 10 is a face view of a variable resistor useful in detecting and measuring deflection occurring in a deflective mount;

Fig. 11 is a wiring diagram illustrating an amplidyne signal translation mechanism as employed in a direct current circuit;

Figure 12 is a wiring diagram showing a Selsyn transmitter arranged to detect and measure the deflection of a deflective mount, and to supply a signal suitable for controlling a thyratron motor-drive.

Figure 13 illustrates diagrammatically an electro-hydraulic signal-translating and force-applying mechanism; and Figure 14 is a perspective view, with portions omitted for convenience of illustration, of a modulating valve used in the system of Fig. 13.

The principal features of my invention relate to providing a method, and means for accomplishing that method, whereby a "feel-back" of force is obtained in simulation of, and in proportion to, external forces applied to a remote-controlled element. From the broad standpoint such a system requires permitting a deflection to take place in order that there may be movement in response to, and proportional to, external forces which can thus be detected. Such a deflection may be in the nature of but a few thousandths of an inch, but nevertheless will comprise a movement which can be employed. That being the case, the movement is detected and translated, as to direction and magnitude, into a signal, preferably electrical, which can then be transmitted in its original or magnified form to a force mechanism which will apply torque or other force to an initiating control member in the hands of an operator. By insuring that the force applied to the operating element is in the same relative direction, and proportional to, the main external force, he will gain a sense of those external forces and be able to make such adjustments as are necessary to compensate for the circumstances which he encounters. It should be noted, however, that the proportionality between external force and the operator's "feel-back" may, by design, be caused to vary, as between one range of operation and another. Also, two or more "levels of response" can be designed into the system—a sensitive level suited for aircraft controls at landing speeds, and a less sensitive level for normal speeds. By the practice of such a system through the use of electro-mechanical means, great flexibility can be had from a control standpoint. On certain occasions, substitution into the system of well arranged hydraulic means is possible and desirable. Throughout the electrical field there are many elements available for use in my system and there are similar elements of a more or less equivalent nature that may from time to time be substituted to meet or accommodate abnormal or subnormal conditions or to overcome difficulties arising out of the use of improperly adapted elements for given conditions.

My system is so arranged and devised that it will accurately carry back to an operator who initiates movement of a controlled element, a resistive action which is fully proportional to forces or changes that apply to the controlled element. It is through such means that applications now served by mechanical or hydraulic systems may be replaced with electrical operation and subsequent gains obtained flowing directly therefrom.

Referring particularly to the force diagrams of Figs. 3 through 6 inclusive, wherein are illustrated several normal and reaction reflective conditions, I designate a controlled element 20, having a pivotal coupling 22, with a mounting element 24 that is positioned between spring sections 26 and 27 which are seated upon base elements 28 and 29, respectively. The member 20 may be a rudder, aileron, or elevator surface of an airplane, or it may be a similar element of control in a water or a land vehicle, or an industrial machine. Between controlled member 20 and crank arm 30 is a link 32 which, when the crank is swung, moves the controlled element likewise. For the purposes of these diagrams, no particular means is shown for moving the crank, since the operation of the same will be readily understood. The crank, however, does have firm support upon base portion 34 generally immovable relative to the bases for springs 26, 27.

In Figure 3, the element 20 is shown swung to a position where it would, as a rudder, cause turning of an aircraft. In that case, the beam pivotally mounted on base 38 lies in normal position, since there is shown to be no external un-normal force acting upon element 20. However, Figure 4 illustrates a typical situation wherein force F, directed upon element 20 has not altered its set position because of its actuating force Fa, but has resulted in a reaction force Rv and a deflection of mount 24, to which it is pivotally coupled, causing a compression of spring 26 and a corresponding expansion of spring 27. In such case the beam 36 has been swung on its pivot to provide a magnified movement useful in my feedback system. A similar situation is diagrammed in Figures 5 and 6, the only change being that the element 20 is positioned where, as a rudder, it would be steering a straight course. Thus, when an external force F is resisted by the actuating force Fa, the resulting force on mount 24 produces swinging of the beam 36 until equalled by reaction force Rv exerted by base 29, in a manner suitable for detection of the deflection and the creation of a signal.

In Fig. 1, wherein the same numerals designate parts like those shown diagrammatically in Figs. 3 to 6, inclusive, I have shown the various base elements as all being a part of a unitary base, designated as a whole by the numeral 18. In this master schematic perspective, movement of crank 30 is obtained by electrical means from the remote operator lever 40 which, in the case of an airplane rudder, would be the control stick. A link 41 extends between lever 40 and crank 42 of operating control unit 44, which is electrically connected with a reversing motor controller 46 by conductors 48, 49. Alternating current is supplied to unit 46 in activation of the circuit and current flows from the reversing motor controller 46 to the motor 50 through leads 51, 52. Rotation of motor 50 results, by means of the worm 54 and sector 55, in swinging motion of the crank arm 30. Between sector 55 and the crank 56 of the compensating control unit 60 is the link 58, which imparts to control 60 an indication of the position of the sector. Control 60 is coupled by leads 62 and 63 with the operating control unit 44 and feeds thereto a current to normalize the operating control unit 44 when sector 55 has reached a position prescribed by the position of operating lever 40.

With such an arrangement, movement of lever 40 impresses upon the electrical circuit characteristics resulting in there being transmitted to the motor 50 a signal that will cause the sector, and hence the member 20, to assume a desired position. Return of the lever 40 to its normal position will result in member 20 reassuming its normal plane.

In the preferred form of the invention, beam 36 carries at its free end a laminated magnetic bridge 70 which is normally positioned equally spaced between the cores 73 and 75 of transformers 72, 74, respectively, which cores are laminated and U-shaped, and are placed in opposition, as shown. There is a slight air gap between the bridge and the ends of the legs of the transformer cores and these gaps normally are equal to each other where a condition of balance exists.

Transformers 72, 74 are alike, and each comprises a primary and secondary winding, and each is mounted stationary relative to the base 18. Slight movement of the beam 36 causes the bridge 70 to decrease one air gap, and to increase in proportion the air gap on the other side of the bridge. Of the two transformers, the primaries are connected in series in a source of alternating electrical current whereas the secondaries are connected in opposition. This arrangement of coils and cores I call a "differential transformer." Thus, when the fluxes are the same in the two cores, no voltage appears in the secondaries. On the other hand, when the bridge moves in either direction the flux of one transformer core will increase, and that of the other will decrease, and there will be a dominating secondary voltage induced in that core toward which the bridge has been moved. The dominating voltage is carried from the secondaries to the signal rectifier 76 by leads 77, 78.

Current is supplied to rectifier 76 from the current source by suitable wiring, to provide for amplifying the signal from the secondaries of transformers 72 and 74.

It is to be understood that the voltage appearing in the secondary circuit is the algebraic sum of the voltages in the two opposed secondary windings, and is easily accommodated as a control means for an amplidyne. As one air gap becomes less than the other, that secondary nearest has a rise in voltage and is in phase with, or is 180° displaced from the primary voltage depending upon which air gap is the smaller.

The useful functions of the differential transformer do not depend upon a single bridge serving the magnetic circuits of both transformers. The same results can be obtained by mounting transformer 72, 73 at a distance from transformers 74, 75 and providing each with a bridge, one moving to reduce its own air gap, while the other moves to increase its own air gap. By making the two bridges operable from two independent deflections, the differential transformer will perform balancing functions.

The differential voltage of the secondaries—hereafter called the signal—is applied through transformer 80 to the opposed triodes 81, 82 of Fig. 2. If the signal is in phase with the primary voltage (and therefore with the voltage applied to the triodes), triode 81, for instance, passes a half-wave current in the direction of solid arrow P. This current causes the amplidyne 84, driven by motor 85, to supply current to the armature of the torque motor 86, in a direction indicated by the solid arrow T. The magnitude of current T depends upon the magnitude of current P which depends upon the extent of the unbalance of the airgaps of the differential transformer. If the signal is 180° out of phase with the primary and triode voltages, triode 82 will pass a half-wave current in the direction of dashed arrow P'. This causes the amplidyne 84 to supply current to the torque motor 86 as shown by dashed arrow T', and the magnitude of current P' and current T' are proportioned to the unbalance of the air gaps, as before. Since the field current of the torque motor is constant, the torque exerted by the torque motor is proportional to the magnitude of the armature current. The direction of torque will depend upon the direction of the current through the armature of motor 86 which is a D. C. shunt-wound motor.

Shown in Figures 1 and 2 is a power transformer 88 which serves the primaries of the differential transformer comprising coils 72, 74. It also serves the signal rectifier 76 as indicated, and the field rectifier 89. Filter 87 is employed to smooth out the impulses of the rectified A. C. current to the amplidyne field, but is not an essential to the operation of the invention.

Motor 86 operating either direction as prescribed by the "feel-back" circuit rotates or tends to rotate pinion 90 which is in mesh with sector 92 carried by lever 40. Torque thus applied to the lever gives the operator the sensation which is sought, namely a "feel" of the forces acting on the remotely-controlled element.

Alternative deflection mounts

Fig. 8 shows a deflective mount applied, not to the remotely-controlled element 20 as shown in Fig. 1, but to the operating mechanism which moves the remotely-controlled element. The advantages are: (1) Existing or conventional methods of supporting the controlled element itself need not be altered to incorporate the feel-back system. (2) Because of the mechanical advantage of the operating mechanism, a deflective device near the motor has relatively small forces acting on it and the parts may be correspondingly small and light.

Referring to Fig. 8, arm 30 and sector 55 are keyed to the same shaft and therefore maintain a fixed relationship. Motor 150 is secured to a base 151 which is hinged at one end, concentrically with sector 55, and which is restrained at the other end 152 by opposed springs 126 and 127. An upward force on the controlled member 20 compresses spring 127 and diminishes the lower air gap between bridge 170 and core 174 of the differential transformers, with the same results as described for Fig. 1. Similarly, a downward force on the controlled member 20 compresses spring 126 and decreases the upper air gap between bridge 170 and core 172 of the differential transformers. Thus it is to be seen that this arrangement of the deflective means is useful in producing "feel-back" such as is obtained by locating it at the support of controlled element 20.

Another variation of the deflective mount is shown in Fig. 9. In this case, as in Fig. 1, the deflection takes place at the main support of the controlled element 20, but with a rugged and much simpler structure. Referring to Fig. 9, the controlled element 20 is supported by a deflective member represented by the leaf-spring 218 supported from base 220 and which acts as a cantilever beam to carry the arm 230, bridge 270 between coils 272, 274 that detect reactions due to forces acting on element 20. Assuming an upward force on element 20, link 32 and arm 30 resist the force but the resulting force at the support 22 deflects the leaf-spring member 218 downward, the deflection being proportional to the force. This decreases the lower air gap of the differential transformer, thus giving rise to the signal as described for Fig. 1. The cantilever member 218 is so designed that for maximum force the deflection will not exceed the few thousandths of an inch of clearance provided at the air gaps of the differential transformer. Stops may be provided to guard against damage to the differential transformers—or other deflection-detecting means—in case of abnormal stresses.

Alternate deflection detectors

The description of the feel-back device as shown in Figs. 1 and 2 is based on the differential transformer as the deflection-measuring means. However, other means may be used to advantage in many applications.

When D. C. current is the preferred source of power, two rheostats 106, 108 linked to the deflective mount as suggested by Fig. 10 so as to have a motion proportional to the deflection, offer a simple solution to the problem of securing "feel-back." In Fig. 10, the shaft 110 of the rheostat arm 112 is fitted with a pinion 114 meshing with a gear sector 116 pivoted at 118, so that the full range of the rheostat can be employed with a small angular movement of the sector. A link 120 connects the sector to arm 136 (the equivalent of arm 36) or to the end of the motor base (see Fig. 8), so that a force acting on controlled element 20 and causing movement of the deflective means will, through the connections just described, cause the two rheostats 106, 108 to deviate from their normal positions and produce a D. C. voltage in the signal circuit.

Fig. 11 shows the circuit employing this principle. The two rheostats 106, 108 are mounted on a common shaft so that both rotate together. The resistance windings are connected in parallel to the D. C. system, and in such a way that when the two rheostat arms are shifted, the moving contacts are at points of equal potential when, and only when, these moving contacts are at MM, the mid-points of the resistance windings. This position of equal potential is the position of "no force" on the controlled element and therefore no deflection of the deflective mount.

The moving contacts 122 of the rheostats are connected to the field of an amplidyne 84 driven by a D. C. motor 85. The amplidyne field has no voltage applied to it when the moving contacts 122 are at the normal or equal-potential position, MM. If the deflective mount moves and causes the two contacts to move clockwise to a new position NN, the moving contact of rheostat 106 is nearer the positive than the negative end of the rheostat; while the moving contact of rheostat 108 is nearer the negative than the positive end of the rheostat, so that a voltage is applied to the amplidyne field and a current flows in it from left to right. The amplidyne 84, therefore supplies a current, represented by arrow T, to the torque motor 86 which rotates or tends to rotate depending upon whether the operator permits his lever 40 to move in the direction of the feel-back force, or holds lever 40 stationary. The magnitude of the current in the amplidyne field depends upon how far the moving contacts 122 of the rheostats are displaced from position MM. The farther they move the greater the voltage difference, the greater the amplidyne field current, and the greater the current to the torque motor. Therefore the feel-back effort exerted by the torque motor is proportional to the forces acting on the controlled member 20. It is clear that if the deflective means causes the moving contacts of the rheostats 106, 108 to move counter-clockwise from position MM to position SS, moving contact of rheostat 106 is nearer to the negative than the positive end of the resistance winding, and the moving contact of rheostat 108 is nearer to the positive than the negative end of winding 108. The voltage applied to the amplidyne field and the current in it are therefore in the opposite direction from those of position NN, and the current T' to the torque motor armature is also in the opposite direction. This type of rheostat is shown for its simplicity of representation; other types may be preferable for mechanical reasons.

Another alternate form of deflection detector is indicated in Fig. 12. The 3 phase winding of the Selsyn transmitter 200 is connected to a source of 3-phase A. C. The single-phase winding 201 is connected through transformer 202 to the grids of thyratron tubes 204. The rotor 201 of the Selsyn transmitter 200 is furnished with a pinion and sector and linked to the deflective mount in all respects like the rheostat of Fig. 10, so that for full effect the rotor will rotate through 180 electrical degrees when the deflective mount accomodates the maximum force. When the rotor is at the normal position corresponding to no deflection of the mount, the voltage applied to the grids of the thyratrons is 180° out of phase with the plate voltage and no current flows to the torque motor. As the mount is deflected the Selsyn rotor is turned by the linkage and gearing, causing the grid voltage to be more nearly in phase with the plate voltage. As the phase angle diminishes between the grid voltage and the plate voltage as the rotor is turned farther, the current increases to the armature of torque motor 208, thus increasing the feel-back force. The field of the torque motor 208 is here shown supplied with its D. C. excitation from one section of the power transformer 206 through a double-diode rectifier tube 210, but any source of D. C. is satisfactory. The circuit of Fig. 12 as shown, will furnish feel-back in only one direction, as might be desirable in application to hoists, cranes, jacks, or presses, where the operator needs to sense the forces encountered by the remote-controlled element. To extend this Selsyn-operated system to feel-back in two directions, it is only necessary to use two Selsyn transmitters, two grid transformers, and four thyratron tubes. An interlock would be necessary to keep either Selsyn from overtravelling the zero position.

Electro-hydraulic system

Alternative to applying the feel-back force to the manually operable lever 40 by means of a torque motor as heretofore discussed, an hydraulic system may be employed. Fig. 13 shows an oil sump or reservoir 301, a constant displacement pump 302 driven by a motor 303, supplying a constant volume of liquid through manifold 304 to the balanced control-valve 305. Oil, as the usual liquid leaves the control valve through conduits 309, 310 and fills both ends of force-cylinder 313. Having filled the system, the oil from pump 302 escapes by way of pipes 317, 318 and modulating valves 319, 320. Referring to Fig. 14, which is a cut-away view of the modulating valve, the longitudinally slotted port 326 is normally closed by piston 327 pushed up by spring 328. Oil reaching modulating valves 319, 320 can not escape and the pressure rises, pushing piston 327 downward against the force of spring 328 until the area of slotted port 326 above piston 327 is just sufficient for the flow. The pressure thus created in depressing the piston of a modulating valve, is also present in the end of the force cylinder connected to the same pipe.

When the control-valve piston 311 is in mid position ports 309, 310 are of equal area and equal quantities of oil flow through them and through pipes 317, 318. Since the modulating valves 319, 320 are passing the same flow their pistons 327 are pushed down the same distance and springs 328 are compressed to the same extent and are therefore exerting equal forces. Equal pressures therefore exist on both sides of piston 314 of force cylinder 313, and no force acts on manually operable lever 40 to which the piston is coupled by rod 324 and link 325. Under these conditions lever 40 may be freely rocked back and forth, piston 314 will cause oil to pass from one end to the other of force cylinder 313 through ports 309, 310, and manifold 304. This hydraulic system is made to furnish feel-back by providing means for moving the balanced control valve in response to a signal electrically derived from some form of deflective mount as previously described.

In Fig. 13 the signalling means consist of the differential transformers 72, 74 whose secondaries are connected to solenoids 307, 308. When the air gaps of the differential transformer are equal, the forces exerted by solenoids 307, 308 are equal and piston 311 of the balance valve is in mid position. If a force acting on the controlled member causes the magnetic bridge 70 to move toward the right, solenoid 308 would pull the control valve to the left, partially closing port 309 and increasing the opening of port 310. More oil flows through port 310 and pipe 318 and less through pipe 317. The modulating valve 320 must open wider, further compressing spring 328, which increases the pressure in pipe 318 and in the right-hand chamber of force cylinder 313. Similarly, modulating valve 319 will not maintain its former opening because the oil flow is reduced, its spring 328 expands to reduce the opening of the slotted port 326 and the pressure decreases in pipe 317 and the left-hand chamber of force-cylinder 313. Thus the piston 314 of the force-cylinder 313 has a higher pressure on the right side than on the left and the operator of lever 40 feels a force urging lever 40 to the right. If the lever is allowed to move in that direction some oil flows into the right hand end of cylinder 313 instead of flowing out through modulating valve 320, or flows around through port 319, 310, and manifold 304. Feel-back forces in the opposite direction result from moving the bridge of the differential transformer to the left toward transformer 72.

For a given degree of unbalance of the differential transformer, the solenoids 307, 308 will move the balanced valve a definite amount, for the reasons that as one solenoid core prevails and moves toward its magnetic center its force diminishes; and as the other solenoid core is pushed farther from its magnetic center its force increases. Thus if the solenoids and balanced valve are displaced a small amount, no further displacement will occur until the current is further increased in the one solenoid or further diminished in the other.

Relief valve 330 is in no wise essential to the operation of this system, but is indicated as a safety feature provided on all constant displacement pumps.

This action can be obtained with equal ease by the use of the rheostatic deflection detectors shown in Fig. 10. Instead of the potentiometer circuit of Fig. 11, each rheostat would be in series with one solenoid across the power source (A. C. or D. C.). The two rheostats would be mechanically linked as in Fig. 11, and so connected that movement in one direction would strengthen solenoid 307 and weaken solenoid 308 of Fig. 13. Movement in the other direction would strengthen solenoid 308 and weaken solenoid 307. Thereby movement of piston 311 is effected.

It should be obvious to those skilled in the art that the system shown in Fig. 13 may be employed as a remote thrust element in which case a manually operable lever can be associated with bridge 70 or with a dual rheostat, such as in Fig. 10, to control the solenoids 307 and 308. Under such circumstances the element to which thrust is remotely applied will be connected with rod 324.

The use of "external reaction force" herein means those forces set up in the member to be moved, in its main supports, or in its operating linkage or mechanism, by the action of external forces. I employ proportional to mean the condition of bearing some prescribed and definite, but not necessarily linear, relationship to the independent variable.

While I have shown and described particular embodiments of my invention, it will occur to those skilled in the art that various changes and modifications may be made without departing from the invention, and I, therefore, aim in the appended claims to cover all such changes and modifications as fall within the true spirit and scope of my invention.

Having thus described my invention, I claim:

1. A reaction reflector mechanism, comprising: a member to be moved; means for moving said member; a manually-movable control element; between said control element and said member to be moved, coupling means for producing correlated movement of the member to be moved; an element deflective by external reaction forces applied to said member to be moved; means for detecting such deflection, including: a magnetic bridge and a transformer core arranged to form a magnetic circuit, said transformer having a primary and a secondary winding; a source of electrical energy to the primary winding; means for varying the flux of said magnetic circuit; means connected with the secondary winding and responsive to voltage changes therein caused by change of the flux of said circuit to produce an electrical signal reflective of the magnitude of the external reaction forces; and means coupled to said control element for variably applying force thereto and connected to said signal-producing means and responsive to such signals to impart "feel-back" to the manually-movable control element.

2. A reaction reflector mechanism, comprising: a member to be moved; electro-mechanical means for moving said member; a manually-movable control element; between said control element and said electro-mechanical means, means for translating movement of said control element into electrical signals, and means for conveying such signals; a mount deflective by external reaction forces applied to said member to be moved; means for detecting such deflection, including: a magnetic bridge and a transformer arranged to form a magnetic circuit, said transformer having a primary and a secondary winding; a source of electrical energy to the primary winding; means for varying the flux of said magnetic circuit; means connected with the secondary winding and responsive to voltage changes therein occasioned by change of the flux of said circuit; and means coupled to said manually-movable control element for applying force thereto, said means being responsive to voltage changes produced in said deflection-detecting means to thereby impart a "feel-back" to the manually movable control element.

3. A reaction reflector mechanism, comprising: a member to be moved; electro-mechanical means for moving said member; a manually-movable control element; between said control element and said electro-mechanical means, means for translating movement of said control element into electrical signals, and means for conveying said signals; a mount deflective by external reaction forces applied to said member to be moved; means for detecting deflection of said mount and for transmitting signals reflective of the magnitude of such external reaction forces; and electrically created torsion means coupled with said manually-movable control element for applying force thereto, said means being responsive to signals from said deflection-detecting and signal-transmitting means to thereby impart "feel-back" to the manually-movable control element.

4. A reaction reflector mechanism, comprising: a pivoted member to be moved; electro-mechanical means for moving said member; a manually-movable control element; between said control element and said electro-mechanical means, means for translating movement of said control element into electrical signals, and means for conveying said signals; the pivot of said member being deflective by external reaction forces applied to said member to be moved; means for detecting such pivot deflection and for transmitting signals reflective of the magnitude of said external reaction forces; and means coupled with said manually movable control element for applying force thereto, said means being responsive to signals from said deflection-detecting and signal-transmitting means to thereby impart "feel-back" to the manually-movable control element.

5. A reaction reflector mechanism, comprising: a member to be moved; electro-mechanical means for moving said member; a manually-movable control element; between said control element and said electro-mechanical means, means for translating movement of said control element into electrical signals and for conveying such signals to the moving-member actuation means; a mount deflective by external reaction forces applied to said member to be moved; means for detecting such deflection, including: a magnetic bridge and a transformer core arranged to form a magnetic circuit, said transformer having a primary and a secondary winding; a source of electrical energy to the primary winding; means for varying the flux of said magnetic circuit; an amplidyne whose control field is connected with the secondary winding through rectifier means therebetween and responsive to voltage changes induced in the secondary winding by change of flux of said circuit; electro-motive means coupled to said control element for applying force thereto and electrically connected to said amplidyne to be controlled thereby.

6. A reaction reflector mechanism, comprising: a member to be moved; electro-mechanical means for moving said member; a manually-movable control element; between said control element and said electro-mechanical means, means for translating movement of said control element into electrical signals and for conveying such signals to the moving-member actuation means; a mount deflective by external reaction forces applied to said member to be moved; means for detecting such deflection, including: a magnetic bridge and a transformer core arranged to form a magnetic circuit, said transformer having a primary and a seconday winding; a source of electrical energy to the primary winding; means for varying the flux of said magnetic circuit; an amplidyne whose control field is connected with the secondary winding and responsive to voltage changes induced therein by change of flux of said circuit; electro-motive means connected to said amplidyne to be controlled thereby, and between said electro-motive means and said control element gear elements for applying force from said electro-motive means to the control element in reflection of the external reaction forces affecting the member to be moved.

7. A reaction reflector mechanism, comprising: a member to be moved; electro-mechanical means for moving said member; a manually-movable control element; between said control element and said electro-mechanical means, means for translating movement of said control element into electrical signals and for conveying such signals to the moving-member actuation means; a mount deflective by external reaction forces applied to said member to be moved; means for detecting such deflection, including: a magnetic bridge and a transformer core arranged to form a magnetic circuit, said transformer having a primary and a secondary winding; a source of electrical energy to the primary winding; means for varying the flux of said magnetic circuit; fluid pressure means coupled with the control element to move the same; and means to control the operation of said fluid pressure means and connected with the secondary winding and responsive to voltage changes induced therein by change of the flux of said magnetic circuit whereby a "feel-back" is imparted to the manually-movable control element in reflection of external reaction forces acting on the member to be moved.

8. A reaction reflector mechanism, comprising: a member to be moved; electro-mechanical means for moving said member; a manually-movable control element; between said control element and said member to be moved, means for translating movement of said control element into electrical signals and for conveying the same to the moving-member actuation means; a mount deflective by external reaction forces applied to said member to be moved; means for detecting such deflection, including: a magnetic bridge and a transformer core arranged to form a magnetic circuit, said transformer having a primary and a secondary winding; a source of electrical energy to the primary winding; means coupled with said deflective mount and operable to obtain relative movement between said magnetic bridge and said transformer to vary the flux of said magnetic circuit; and means responsive to the resulting variations of secondary voltage to apply force to the control element in reflection of deflective movement of said mount to thereby impart a "feel-back" to the manually-movable control element.

9. A reaction reflector mechanism, comprising: a member to be moved; electro-mechanical means for moving said member; a manually-movable control element; between said control element and said electro-mechanical means, means for translating movement of said control element into electrical signals and for conveying such signals to the moving-member actuation means; a mount deflective by external reaction forces acting on said member to be moved; an amplidyne having a field; a source of direct current to said field; balanced variable resistor means between said source and said field; means movable in reflection of the magnitude of the deflection of said mount and coupled with said variable resistor means to vary the direction and strength of current flow to said field; electro-motive means coupled to said control element for applying force thereto and to said amplidyne to be controlled thereby in accordance with the direction and strength of current flow in the amplidyne field.

10. A reaction reflector mechanism, comprising: a member to be moved, electro-mechanical means for moving said member, a manually operable lever member; between said lever member and said electro-mechanical means, means for translating movement of said lever into electrical signals and for conveying such signals to the moving-member actuation means; a mount deflective by external reaction forces acting on said member to be moved, an electrically balanced variable resistor means, a source of direct current to said resistors, an amplidyne having its control field connected to said variable resistors, means movable proportionally to deflection of said mount and coupled to said variable resistor means to vary the direction and strength of current flow in said control field, electro-motive means coupled to said lever member for applying force thereto and connected electrically to said amplidyne for control thereby in accordance with the direction and strength of current flow in the amplidyne field.

DWIGHT DEE DE NISE.

REFERENCES CITED

The following references are of record in the file of this patent:

UNITED STATES PATENTS

| Number | Name | Date |
| --- | --- | --- |
| 1,234,170 | Johnson | July 24, 1917 |
| 2,088,659 | Moseley | Aug. 3, 1937 |
| 2,307,503 | Gulliksen | Jan. 5, 1943 |
| 2,330,569 | Esnault-Pelterie | Sept. 28, 1943 |
| 2,399,675 | Hays | May 7, 1946 |
| 2,410,599 | Conklin | Nov. 5, 1946 |